(12) United States Patent
Truong et al.

(10) Patent No.: US 11,861,041 B2
(45) Date of Patent: Jan. 2, 2024

(54) METHODS AND SYSTEMS FOR AUTOMATICALLY PRESERVING A USER SESSION ON A PUBLIC ACCESS SHARED COMPUTER

(71) Applicant: Capital One Services, LLC, McLean, VA (US)

(72) Inventors: Anh Truong, Champaign, IL (US); Jeremy Goodsitt, McLean, VA (US); Alvin Hua, Gaithersburg, MD (US); Kate Key, Effingham, IL (US); Ernest Kwak, McLean, VA (US); Vincent Pham, Chicago, IL (US); Galen Rafferty, McLean, VA (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 383 days.

(21) Appl. No.: 17/170,714

(22) Filed: Feb. 8, 2021

(65) Prior Publication Data

US 2022/0253549 A1     Aug. 11, 2022

(51) Int. Cl.
*G06F 21/62*     (2013.01)
*H04L 9/08*     (2006.01)
(Continued)

(52) U.S. Cl.
CPC ........ *G06F 21/6245* (2013.01); *G06F 21/602* (2013.01); *G06N 3/04* (2013.01);
(Continued)

(58) Field of Classification Search
CPC .... G06F 21/62; G06F 21/6245; G06F 21/316; G06F 21/602; G06N 3/04; G06N 3/08;
(Continued)

(56) References Cited

U.S. PATENT DOCUMENTS

| 6,182,129 B1 * | 1/2001 | Rowe | G06F 16/957 |
| | | | 707/E17.119 |
| 6,349,337 B1 * | 2/2002 | Parsons, Jr | H04L 67/01 |
| | | | 709/227 |

(Continued)

FOREIGN PATENT DOCUMENTS

| CN | 103067390 A | * | 4/2013 | |
| CN | 110519297 A | * | 11/2019 | ........... H04L 9/0643 |

(Continued)

OTHER PUBLICATIONS

Security and Privacy Preservation Scheme of Face Identification and Resolution Framework Using Fog Computing in Internet of Things by Pengfei Hu, Huansheng Ning, Tie Qiu, Houbing Song, Yanna Wang, and Xuanxia Yao pp. 13; IEEE Internet of Things Journal, vol. 4, No. 5, Oct. 2017.*

(Continued)

*Primary Examiner* — Shahriar Zarrineh
*Assistant Examiner* — Ali H. Cheema
(74) *Attorney, Agent, or Firm* — Bookoff McAndrews, PLLC

(57) ABSTRACT

A computer-implemented method may include: receiving, from at least one camera, image data associated with a first user at a public access user computing device; detecting, based on the received image data, by employing a machine learning model trained using a dataset of actions collected from a plurality of previous users, that the first user has moved away from the public access user computing device; automatically encrypting, based upon the detection, a user session associated with the first user, wherein the encrypted user session is configured to be subsequently activated by the first user; and initiating a new generic user session on the public access user computing device for a second user.

16 Claims, 4 Drawing Sheets

(51) Int. Cl.
| | |
|---|---|
| *H04L 9/06* | (2006.01) |
| *G06F 21/60* | (2013.01) |
| *G06N 3/08* | (2023.01) |
| *G06N 3/04* | (2023.01) |
| *G06V 40/20* | (2022.01) |
| *G06V 40/16* | (2022.01) |
| *G06F 21/31* | (2013.01) |

(52) U.S. Cl.
CPC ............ *G06N 3/08* (2013.01); *G06V 40/165* (2022.01); *G06V 40/169* (2022.01); *G06V 40/172* (2022.01); *G06V 40/20* (2022.01); *H04L 9/0643* (2013.01); *H04L 9/0866* (2013.01); *G06F 21/316* (2013.01)

(58) Field of Classification Search
CPC .... G06V 40/16; G06V 40/165; G06V 40/169; G06V 40/172; G06V 40/20; G06V 10/44; H04L 9/0643; H04L 9/0866
USPC .......................................................... 726/28
See application file for complete search history.

(56) References Cited

U.S. PATENT DOCUMENTS

| | | | |
|---|---|---|---|
| 9,124,670 | B2 | 9/2015 | Neel et al. |
| 9,477,826 | B2 | 10/2016 | Turgeman et al. |
| 10,726,325 | B2 * | 7/2020 | Krishnamurthi ...... G06F 16/957 |
| 10,750,367 | B2 | 8/2020 | Boettcher et al. |
| 2004/0073512 | A1 * | 4/2004 | Maung .................. H04L 63/068 705/51 |
| 2008/0002890 | A1 * | 1/2008 | Hu ....................... G06V 40/162 382/203 |
| 2013/0343616 | A1 * | 12/2013 | Forero .................... G06F 21/32 382/115 |
| 2018/0007059 | A1 | 1/2018 | Innes et al. |
| 2018/0300609 | A1 * | 10/2018 | Krishnamurthy ...... G06N 3/044 |
| 2019/0272668 | A1 * | 9/2019 | Echevarria Vallespi ..................... G06T 15/503 |
| 2020/0134151 | A1 * | 4/2020 | Magi ....................... G06F 21/35 |
| 2021/0185066 | A1 * | 6/2021 | Shah ........................ G06N 3/08 |
| 2021/0200998 | A1 * | 7/2021 | Ghose .................... G06N 20/00 |
| 2021/0201003 | A1 * | 7/2021 | Banerjee ............... G06F 18/214 |
| 2021/0201021 | A1 * | 7/2021 | Novelli .................. G06F 3/013 |
| 2021/0229673 | A1 * | 7/2021 | Singh .................. G06V 20/597 |
| 2021/0264003 | A1 * | 8/2021 | Solano ..................... G06N 5/01 |
| 2021/0281572 | A1 * | 9/2021 | Fernandez-Spadaro ..................... H04L 63/083 |
| 2021/0342975 | A1 * | 11/2021 | Liu ........................... G06T 5/50 |

FOREIGN PATENT DOCUMENTS

| | | | | |
|---|---|---|---|---|
| CN | 111651573 | A * | 9/2020 | |
| CN | 112565270 | B * | 4/2022 | ......... G06F 16/3329 |
| JP | 2003051012 | A * | 2/2003 | ......... G06K 9/00026 |
| WO | WO-2004034192 | A2 * | 4/2004 | ............. H04L 67/02 |

OTHER PUBLICATIONS

Learning based biometric key generation method using CNN and RNN by Jong-hyuk Roh, Sangrae Cho and Seung-Hun Jin pp. 4; 10th ICITEE (Year: 2018).*
A Novel Key Generation Cryptosystem Based on Face Features by Lifang Wu, Xingsheng Liu, Songlong Yuan and Peng Xiao pp. 4; IEEE (Year: 2010).*
Biometric Based Cryptographic Key Generation from Faces by B. Chen and V. Chandran pp. 8; IEEE (Year: 2007).*
Personalised cryptographic key generation based on FaceHashing by Andrew B.J. Teoh, David C.L. Ngo, and Alwyn Goh pp. 9; Published: Jun. 2, 2004.*
A Novel Face Hashing Method with Feature Fusion for Biometric Cryptosystems by Zhao Zeng and Paul A. Watters pp. 6; IEEE (Year: 2007).*
Biometric Hash: High-Confidence Face Recognition by David C. L. Ngo, Andrew B. J. Teoh, and Alwyn Goh pp. 5; IEEE Jun. 2006.*

* cited by examiner

METHODS AND SYSTEMS FOR AUTOMATICALLY PRESERVING A USER SESSION ON A PUBLIC ACCESS SHARED COMPUTER

TECHNICAL FIELD

Various embodiments of the present disclosure relate generally to automatically preserving user sessions on publically shared computers, and, more particularly, to automatically encrypting a user session when a user moves away from a publically shared computer.

BACKGROUND

Unlike private computers, many publically shared computers do not require users to log on with a username and password. A user may desire to securely access a publically shared computer in a public environment without compromising their private information. Sometimes, before leaving a publically shared computer, a user may forget to delete their temporarily stored data and/or sign out of all their service accounts. In some instances, it may be a burden for the user to sign out of all their accounts, close all open browsers, and/or delete their temporarily stored data each time the user steps away from their publically shared computer. Accordingly, it is desirable for individual user sessions on publically shared computers to automatically be encrypted and securely stored for subsequent access when a user steps away from a publically shared computer. Thus, improvements in technology relating to facilitating automatic privacy protection on shared computers are needed.

The present disclosure is directed to addressing above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for automatically preserving user sessions on publically shared computers.

In one aspect, a computer-implemented method of automatically preserving a user session on a public access user computing device may include: receiving, from at least one camera, image data associated with a first user at the public access user computing device; detecting, based on the received image data, by employing a machine learning model trained using a dataset of actions collected from a plurality of previous users, that the first user has moved away from the public access user computing device; automatically encrypting, based upon the detection, a user session associated with the first user, wherein the encrypted user session is configured to be subsequently activated by the first user; and initiating a new generic user session on the public access user computing device for a second user.

In another aspect, a system for automatically preserving a user session on a public access user computing device may include: a memory storing instructions and a machine learning model trained using a dataset of actions collected from a plurality of previous users; and a processor operatively connected to the memory and configured to execute the instructions to perform a plurality of acts. The acts may include: receiving, from at least one camera, image data associated with a first user at the public access user computing device; detecting, based on the received image data, by employing the machine learning model, that the first user has moved away from the public access user computing device; automatically encrypting, based upon the detection, a user session associated with the first user, wherein the encrypted user session is configured to be subsequently activated by the first user; and initiating a new generic user session on the public access user computing device for a subsequent user.

In yet another aspect, a computer-implemented method of automatically preserving a user session on a public access user computing device may include: receiving, from at least one camera, a first set of image data associated with a first user at the public access user computing device; detecting, based on the first set of image data, by employing a machine learning model trained using a dataset of actions collected from a plurality of previous users, that the first user has moved away from the public access user computing device; automatically encrypting, based upon the detection, a user session associated with the first user to prevent a subsequent user from accessing the user session; causing display, on the public access user computing device, of (a) a first option to activate the user session associated with the first user, and (b) a second option to initiate a new user session separate from the user session; and in response to receiving a selection of the first option, receiving a second set of image data associated with the first user from the camera to determine whether to activate the user session associated with the first user.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
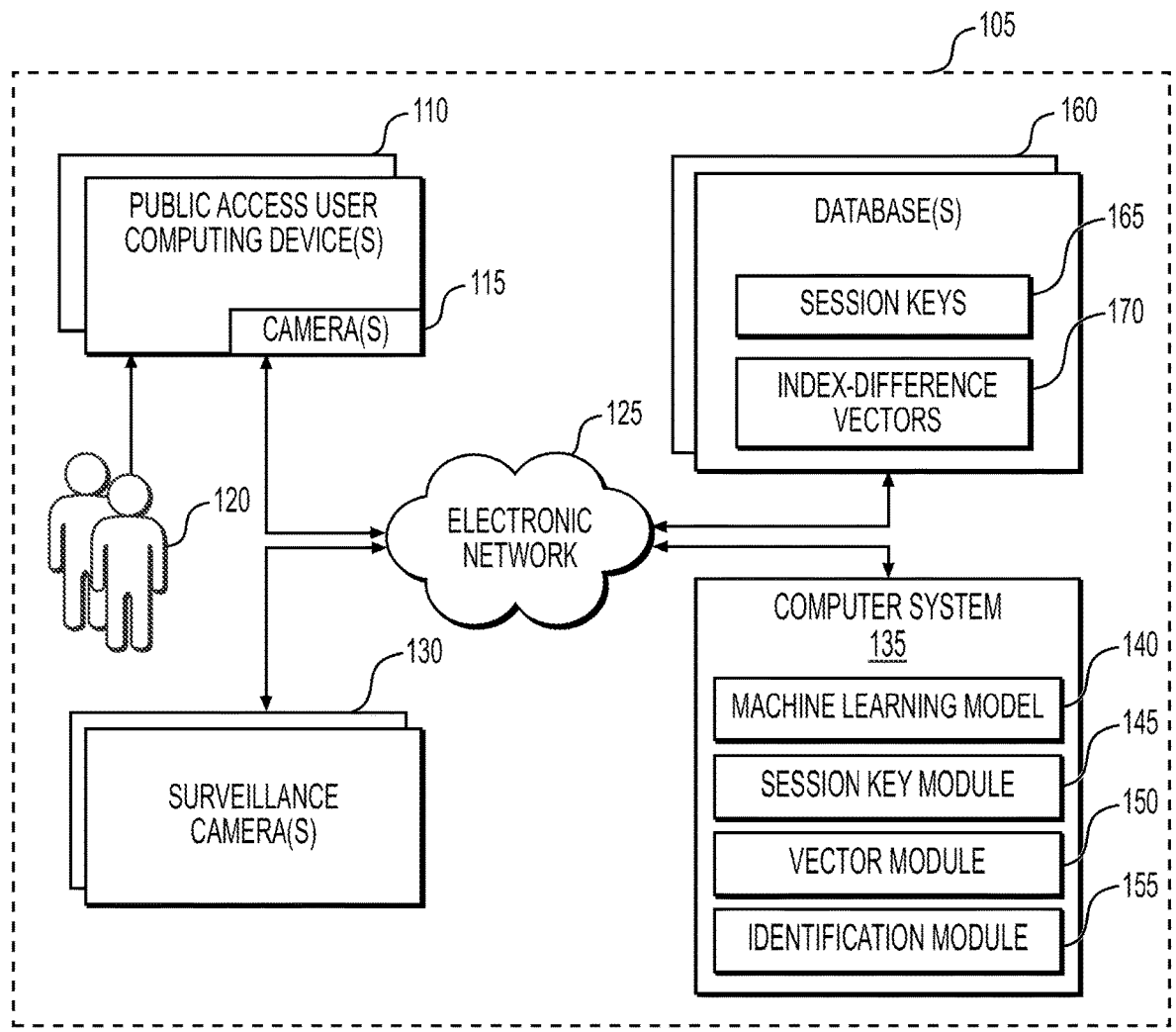
FIG. 1 depicts an exemplary system infrastructure, according to one or more embodiments.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

The terms "user," "individual," "customer," or the like generally encompass a person using a shared computer in a public space, such as a public library, school, café, bank, or the like. The term "user session" generally encompasses a temporary interaction between a user and a publically shared computer. The user session begins when the user connects to a particular network or system and ends when the user disconnects from the network or system. The user session may temporarily store information related to the user's activities while connected to the network or system. The user session may temporarily store sensitive private information, such as account login information (e.g., username and password) associated with various service providers.

In the following description, embodiments will be described with reference to the accompanying drawings. As will be discussed in more detail below, in various embodiments, systems and methods for facilitating the automatic preservation of user sessions on publically shared computers are described.

In an exemplary use case, an individual may visit a café that provides computer stations or desktops for public use. The computer stations and/or the café itself may be equipped with one or more cameras. When an individual user approaches or sits down at a computer station, the computer station and/or café may collect image data of the user using a camera. The user's facial and appearance features may be extracted from the collected image data to create a session key. The user is provided with a new fresh user session (e.g., a predetermined, default, or otherwise generic user session) to work with on the computer station. While at the computer station, the user may be monitored in real time. The computer station's camera(s) and/or the café 's surveillance camera(s) may be used to collect sets of image data of the user to detect when the user leaves the computer station. The user's image data may be analyzed to detect a sequence of actions (e.g., standing up, gathering items near the computer station, putting on a jacket) and to predict a type of movement (e.g., moving away from the computer station). When the user moves away from the computer station, the user's user session is automatically encrypted (e.g., without requiring further user input) to prevent others from viewing the user's activity and private information on the computer session.

The user session may be saved by comparing the user's specific user session with a fresh (default) user session. Differences between the two sessions may be recorded and stored in index-difference vectors. For example, the index-difference vectors may store information regarding temporary file locations and paths, open applications and website browsers, open browser tabs, and usage logs. The index-difference vectors and session key may be transferred to a cloud server. When other customers of the café come to the same computer station, they are met with a new fresh session instead of the previous user's user session. When the previous user returns to the same computer station, they may request to access their user session. The computer station may collect image data of the user and analyze the collected image data to extract the user's facial and appearance features. These features may be used to retrieve the user's session key and activate the user's user session on the computer station.

In another exemplary use case, an individual may visit a public library that provides desktops for public use. The desktops may be equipped with one or more cameras. Image data of a user at a desktop may be collected using the one or more cameras. The one or more cameras may be used to monitor the user in real time to detect when the user moves away from the desktop and returns to the desktop. In yet another exemplary use case, an individual may visit a financial institution that provides kiosks. Each kiosk may be equipped with one or more cameras that may be used to collect image data of each kiosk user. The image data may be used to generate a session key associated with a specific kiosk user. When a kiosk user leaves a kiosk and returns at a later time, image data of the returned kiosk user may be collected. This data may be used to retrieve the session key associated with the returned kiosk user and to subsequently activate the user's user session.

FIG. 1 is a diagram depicting an example of a system environment 100 according to one or more embodiments of the present disclosure. The system environment 100 may include one or more public access user computing devices 110. Each public access user computing device 110 may include one or more cameras 115 to capture image data of one or more users 120 at a respective public access user computing device 110. The system environment 100 may also include an electronic network 125, one or more surveillance cameras 130, and a computer system 135.

The computer system 135 may have one or more processors configured to perform methods described in this disclosure. The computer system 135 may include one or more modules, models, or engines. The one or more modules, models, or engines may include a machine learning model 140, a session key module 145, a vector module 150, and/or an identification module 155, which may each be software components stored in/by the computer system 135.

The computer system 135 may be configured to utilize one or more modules, models, or engines when performing various methods described in this disclosure. In some examples, the computer system 135 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added.

The system environment 100 may also include one or more databases 160 for collecting and storing data including session keys 165 and index-difference vectors 170 generated by computer system 135. These components may be connected to (e.g., in communication with) one another via the network 125.

As used herein, a "machine learning model" is a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

The machine learning model 140 may be trained to detect when users 120 move away from public access user computing devices 110. In some embodiments, the machine learning model 140 may be trained to (i) extract facial and/or appearance features of a specific user 120 from image data received from public access user computing device 110 and/or surveillance cameras 130, and/or (ii) analyze a sequence of actions (movements) of user 120 to predict a type of movement. The facial and/or appearance features extracted may include, but are not limited to, a user's 120 eye shape, eye color, relative dimensions between eyes, nose, and/or mouth, hair color, hair style, articles of clothing, and/or color or pattern of specific articles of clothing.

Types of movements predicted by the machine learning model 140 may include, but are not limited to, reaching for items, standing up, sitting down, moving away from and/or moving towards the public access user computing device 110. In some embodiments, the machine learning model 140 may be trained to detect when an individual user 120 gathers their belongings and/or puts on specific articles of clothing, such as, for example, a jacket, sweater, coat, and/or scarf. Additionally or alternatively, the machine learning model 140 may be trained to detect when user 120 puts on a hat, backpack, and/or purse.

The machine learning model 140 may be a trained machine learning model, such as, for example, a k-nearest neighbor (kNN) and dynamic time warping (DTW) model, or a trained neural network model. The machine learning model 140 may be trained on a dataset of sequences of actions collected from the actions of previous users 120. A neural network may be software representing the human neural system (e.g., cognitive system). A neural network may include a series of layers termed "neurons" or "nodes." A neural network may comprise an input layer, to which data is presented; one or more internal layers; and an output layer. The number of neurons in each layer may be related to the complexity of a problem to be solved. Input neurons may receive data being presented and then transmit the data to the first internal layer through connections' weight. A neural network may include, for example, a convolutional neural network (CNN), a deep neural network, or a recurrent neural network (RNN), such as a long short-term memory (LSTM) recurrent neural network. Any suitable type of neural network may be used.

In some embodiments, a combination of neural network models may be used to detect when user 120 moves away from public access user computing device 110. For example, a CNN model may be used to extract image features (e.g., facial and appearance features) from the image data, and an LSTM recurrent neural network model may be used to predict a specific type of movement based on the sequence of movements captured in the image data. In some embodiments, an LSTM recurrent neural network model may be used to extract image features. In other embodiments, a combination of a CNN model and an LSTM recurrent neural network model may be used to extract image features from the image data.

The session key module 145 may be configured to generate a session key for a specific user 120. The session key is associated with a specific user session, and is based upon the user's 120 appearance and facial features. The session key may be a hash based upon the extracted facial and/or appearance features of user 120 from the captured image data. The session key may be generated when user 120 begins a new session. One or more algorithms may be used to process or convert the extracted image data to create a session key. The generated session keys may be stored in databases 160 (shown in FIG. 1 as session keys 165).

The vector module 150 may be configured to create one or more index-difference vectors associated with a user session. The index-difference vectors may be stored in databases 160 (shown in FIG. 1 as index-difference vectors 170). An index-difference vector may be created for each application opened during an active user session. For example, if three website tabs are opened in a web browser, the vector module 150 may be utilized to create three separate index-difference vectors for each website tab. The associated Uniform Resource Locator (URL) links may also be saved in the respective index-difference vectors.

The identification module 155 may be configured to locate and retrieve a session key associated with a specific user session when a requestor, such as user 120, returns to public access user computing device 110 and requests access to their user session. The identification module 150 may be utilized to analyze image data of the requestor to find, within databases 160, a session key associated with the specific facial and/or appearance features of the requestor. In one implementation, the image data of the requestor may be compared with stored image data of users 120 to determine whether the requestor is one of the users 120 for whom an active session key has been generated. In this implementation, upon determining that the image data of the requestor matches a specific user 120, computer system 135 may retrieve the session key associated with the specific user 120 from databases 160. The retrieved session key may be used to decrypt the first user's user session and activate the user session at the public access user computing device 110.

Computer system 135 may be configured to receive data from other components (e.g., public access user computing devices 110, surveillance cameras 130 or databases 160) of the system environment 100 via network 125. Computer system 135 may further be configured to utilize the received data by inputting the received data into the machine learning model 140, the session key module 145, vector module 150, or the identification module 155 to produce a result (e.g., session keys, index-difference vectors, etc.).

Network 125 may be any suitable network or combination of networks, and may support any appropriate protocol suitable for communication of data to and from the computer system 135 and between various other components in the system environment 100. Network 125 may include a public network (e.g., the Internet), a private network (e.g., a network within an organization), or a combination of public and/or private networks. Network 125 may be configured to provide communication between various components depicted in FIG. 1. Network 125 may comprise one or more networks that connect devices and/or components of environment 100 to allow communication between the devices and/or components. For example, the network 125 may be implemented as the Internet, a wireless network, a wired network (e.g., Ethernet), a local area network (LAN), a Wide Area Network (WANs), Bluetooth®, Near Field Communication (NFC), or any other type of network that provides communications between one or more components of environment 100. In some embodiments, network 125 may be implemented using cell and/or pager networks, satellite, licensed radio, or a combination of licensed and unlicensed radio. Network 125 may be associated with a cloud platform that stores data and information related to methods disclosed herein.

Public access user computing device 110 may operate a client program used to communicate with the computer system 135. The public access user computing device 110 may be used by a user or any individual (e.g., an employee) employed by, or otherwise associated with computer system 135, or an entity 105. Public access user computing devices 110, surveillance cameras 130, computer system 135, and/or databases 160 may be part of an entity 105, which may be any type of company, organization, institution, enterprise, or the like. In some examples, entity 105 may be a financial services provider, a provider of public access user computing devices 110, a provider of a platform such as an electronic application accessible over network 125, or the like. In such examples, the computer system 135 may have access to data pertaining to a communication through a private network within the entity 105. In some cases, the computer system 135 may have access to data collected by public access user computing devices 110 and/or surveillance cameras 130.

Such a user or individual may access public access user computing device 110 when visiting a public facility such as, a public library, an airport, public lobbies, public transportation (e.g., subways), and/or a café or other facility associated with entity 105. The client application may be used to provide information (e.g., real time image data of user 120) to the computer system 135. Public access user computing device 110 may be a smartphone, tablet, a computer (e.g., laptop computer, desktop computer, server), or a kiosk associated with a public facility and/or entity 105. Public access user computing device 110 may be any electronic device capable of capturing a user's 120 biometric data. Public access user computing device 110 may optionally be portable and/or handheld. Public access user computing device 110 may be a network device capable of connecting to a network, such as network 125, or other networks such as a local area network (LAN), wide area network (WAN) such as the Internet, a telecommunications network, a data network, or any other type of network.

Databases 160 may store any data associated with any entity 105, including, but not limited to, financial services providers, or other entities. An entity 105 may include one or more databases 160 to store any information related to a user session associated with the user 120. In some embodiments, the entity 105 may provide the public access user computing device 110. In other embodiments, the entity 105 may provide a platform (e.g., an electronic application on the public access user computing device 110) with which a user 120 or an operator can interact. Such interactions may provide data with respect to the user's 120 user session, which may be analyzed or used in the methods disclosed herein.

Figure 2:
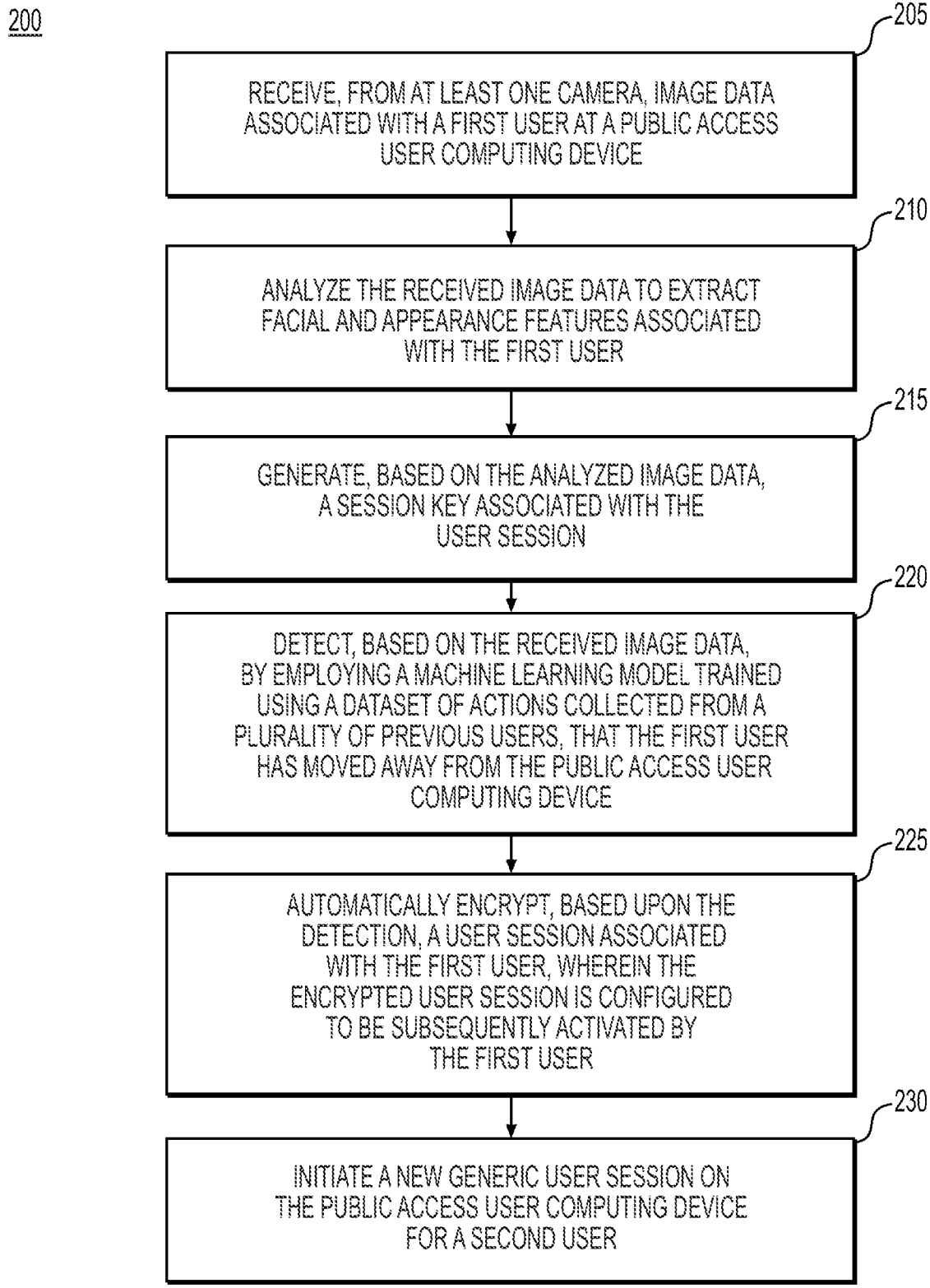
FIG. 2 depicts a flowchart of an exemplary method of automatically preserving a user session when a user moves away from on a public access user computing device, according to one or more embodiments.

FIG. 2 is a flowchart illustrating a method 200 of automatically preserving a user session when a user moves away from public access user computing device 110, according to one or more embodiments of the present disclosure. The method may be performed by computer system 135.

Step 205 may include receiving, via one or more processors, from at least one camera, image data associated with a first user at public access user computing device 110. In some embodiments, image data may be frames of a camera or video feed. In other embodiments, image data may include a live stream of data from the camera or video feed. Image data may be received from one or more cameras 115 associated with the public access user computing device 110. Alternatively or additionally, the image data may include video or camera data from surveillance camera 130 configured to monitor the area of the public access user computing device 110. For example, public access user computing devices 110 may be computer stations provided at an internet café or a coffee shop. In another example, public access user computing devices 110 may be kiosks and/or computer stations provided at a bank. Image data may be received in near real time or real time. In some embodiments, image data may be received on a periodic basis (e.g., frames captured over an interval of time).

Step 210 may include analyzing, via the one or more processors, the received image data to extract facial and appearance features associated with the first user at public access user computing device 110. Facial and appearance features may be detected and extracted from the received image data using machine learning algorithms. For example, machine learning model 140 may be employed to detect and extract specific facial and/or appearance features of the first user from the received image data. The extracted facial and appearance features may include face shape, eye color, size and distance between eyes, nose shape, mouth shape, distance between nose and mouth, eyebrow shape, distance between eyebrows and eyes, width of forehead, hair color, hair style, type of clothing, clothing color, and/or type of accessories (e.g., a bag, hat, scarf, earrings, necklace, bracelet, and/or shoes).

Step 215 may include generating, based on the analyzed image data, a session key associated with the user session of the first user. In the exemplary embodiment, the first user activates a fresh new user session when first using the public access user computing device 110. The session key is specific to the first user's user session. The session key may be based upon the extracted facial and appearance features of the first user. The session key may be generated any time after extraction of the first user's features from the image data. The generated session key may be stored in databases 160.

Step 220 may include detecting, via the one or more processors, based on the received image data, that the first user has moved away from the public access user computing device 110 by employing machine learning model 140. The machine learning model 140 may be trained using a dataset of actions collected from a plurality of previous users. The computer system 135 may receive sets of image data of the first user and the public access user computing device 110 on a continuous basis over a period of time. The computer system 135 may analyze the sets of image data in near real time to detect a sequence of actions and to predict a type of body movement and/or behavior. For example, by tracking the first user's eye movement, the computer system 135 may predict that the first user is reading or viewing information on the public access user computing device 110. In another example, the computer system 135 may predict that the first user is moving away from the public access user computing device 110 by detecting a series of movements, such as standing up, backing away from the camera 115, and/or moving outside the range of the camera 115.

Step 225 may include automatically encrypting, via the one or more processors, based upon the detection, the user session associated with the first user. The user session is automatically encrypted to prevent a subsequent user from accessing the first user's private information. The encrypted user session may be configured to be subsequently activated by the first user when the first user returns to the public access user computing device 110. Encrypting the user session includes comparing the differences (changes) between the first user's current session and a fresh (default) session to create one or more index-difference vectors. The index-difference vectors store elements representing these differences to enable data associated with the first user's current session to be saved. This data may include, but is not limited to, temporary file locations/paths, applications being used by the first user, usage logs associated with these applications, and web browsers and tabs that are being used by the first user. The index-difference vectors and any accompanying files may be linked to the first user's session key and stored in databases 160 for subsequent retrieval.

Step 230 may include initiating, via the one or more processors, a new generic user session on the public access user computing device 110 for a second user. In the exemplary embodiment, after encrypting the first user's session, the computer system 135 provides a new fresh (e.g., default, standard, etc.) session to others who come to the same public access user computing device 110 used by the first user. Thus, instead of being met with the first user's current session, a new second user is able to start their own session on the same computing device 110.

Figure 3:
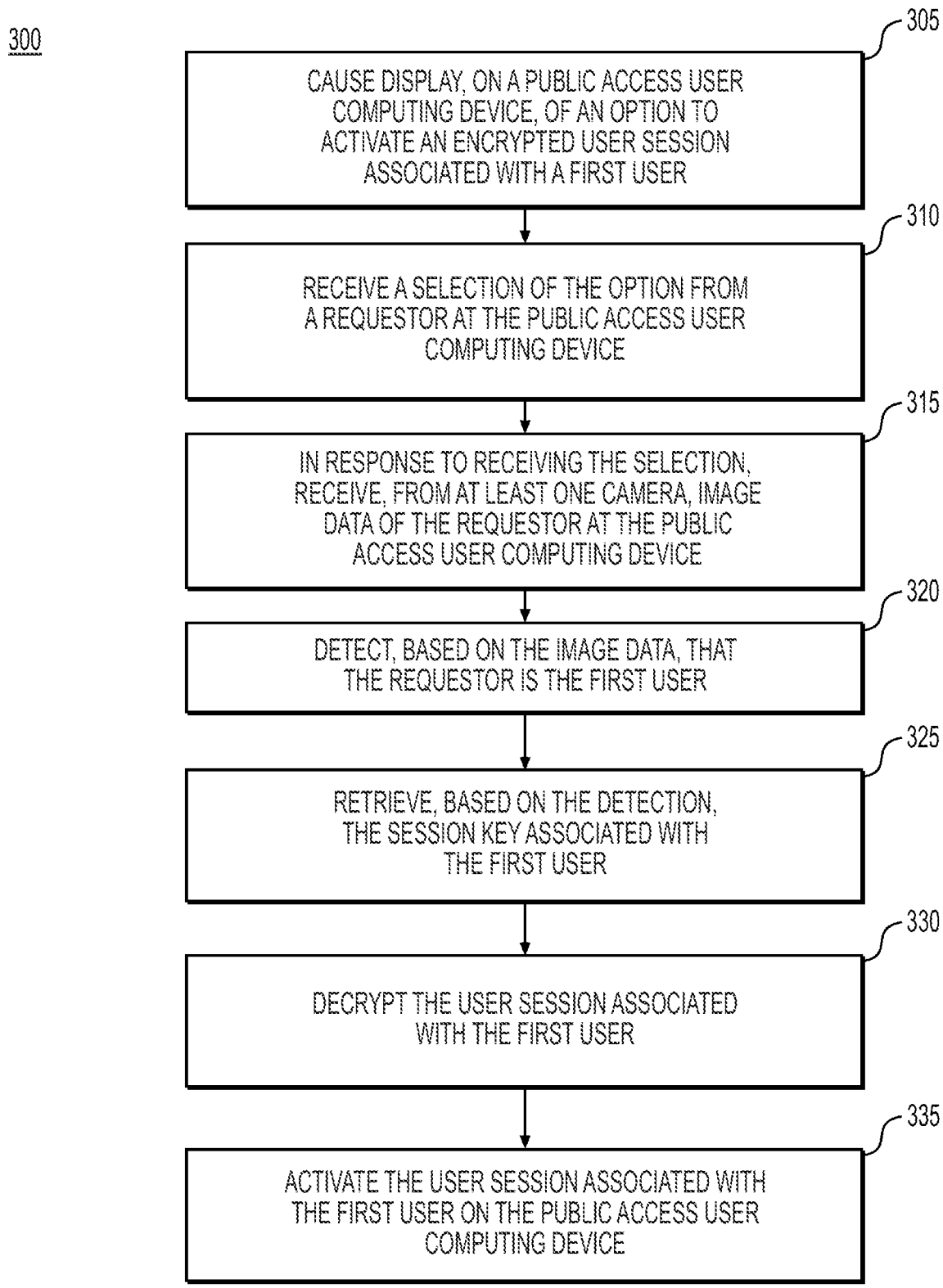
FIG. 3 depicts a flowchart of an exemplary method of activating an encrypted user session when a user returns to a public access user computing device, according to one or more embodiments.

FIG. 3 is a flowchart illustrating a method 300 of activating an encrypted user session when a user, such as a first user, returns to the public access user computing device 110, according to one or more embodiments of the present disclosure. The method may be performed by computer system 135.

Step 305 may include causing display, via the one or more processors, on the public access user computing device 110, of an option to activate an encrypted user session associated with the first user. In various embodiments, when a requesting user (requestor), such as the first user or a new, subsequent user (e.g., a second user), accesses the public access user computing device 110, the requestor may be prompted with a first option to activate the encrypted user session of a previous user and a second option to initiate a fresh user session (separate from the encrypted user session). In these embodiments, if the requestor is the first user, the first user would select the first option when returning to the public access user computing device 110. In some embodiments, the option to activate the encrypted user session may not be available to the requestor (e.g., may not be displayed on the public access user computing device 110) until after the computer system 135 determines that the requestor is a returning user.

Step 310 may include receiving, via the one or more processors, a selection of the option to activate the encrypted user session from the requestor at the public access user computing device 110. In some embodiments, in response to selecting the option to activate the encrypted user session, the requestor may be prompted to stand in front of and/or otherwise face the camera 115. Step 315 may include in response to receiving the selection, receiving, via the one or more processors, from at least one camera (such as camera 115 and/or surveillance camera 130), image data of the requestor at the public access user computing device 110.

Step 320 may include detecting, via the one or more processors, based on the image data, that the requestor is the first user. In some embodiments, the computer system 135 may compare the received image data of the requestor to stored image data of the first user to determine whether the requestor is the first user. Step 325 may include retrieving, via the one or more processors, based on the detection, the session key associated with the first user. Step 330 may include decrypting, via the one or more processors, the user session associated with the first user. Step 335 may include activating, via the one or more processors, the user session associated with the first user on the public access user computing device 110. The computer system 135 may use the appearance and facial features of the requestor to retrieve the session key from databases 160. If the session key is found, the first user's user session may be returned and decrypted. The computer system 135 may retrieve, from the databases 160, the one or more index-difference vectors and associated files linked with the session key. The computer system 135 may subsequently calculate the first user's session from the retrieved index-difference vectors and activate the user session at the public access user computing device 110.

In some embodiments, the first user may return to a different public access user computing device 110 than the one used by the first user prior to stepping away. For example, the public access user computing devices 110 may be part of a network of computing devices and/or may be provided by a single entity. In an exemplary use case, the public access user computing devices 110 may be provided in a public library. The first user may step away from their desk and return to find someone else at their desk using the public access user computing device 110. The first user may find an available public access user computing device 110, at a different desk, and subsequently request that their encrypted user session be activated on that computing device instead.

In these embodiments, the first user may select the option to activate an encrypted user session at the available public access user computing device 110. The computer system 135 may receive image data of the first user from the camera 115 of the available public access user computing device 110, and extract facial and/or appearance features of the first user from the received image data. The computer system 135 may subsequently use the extracted facial and/or appearance features to locate the first user's session key from the databases 160.

In various embodiments, after the first user is done using the public access user computing device 110, the computer system 135 deletes the first user's data before the first user leaves. In one example, the computer system 135 may cause display of an "end session" option or the like on the public access user computing device 110. When the first user selects this option, the computer system 135 may remove data associated with the first user's user session from databases 160. For example, the computer system 135 may delete the index-difference vectors, session key, and/or image data associated with the first user. In some embodiments, the computer system 135 may cause display of a pop-up notification or a message on the public access user computing device 110 informing the first user that their data has been (or will be) deleted.

Unlike personal computers and portable devices, publically shared computers are shared among members of the public, and thus may be more susceptible to security risks, as users of publically shared computers are generally restricted from accessing and changing computer control settings. For example, users of publically shared computers are generally unable to download security protection measures onto publically shared computers to protect sensitive persona data, as these are borrowed devices (as opposed to privately owned devices). The disclosed embodiments herein provide techniques that improve upon the data security and privacy features of publically shared computers, thereby facilitating the protection of a user's sensitive online work (e.g., sensitive data associated with a user's work or workplace) and/or personal data (e.g., social security information, credit card information, account passwords and logins). Instead of (i) ending (and subsequently requesting) a user session on a publically shared computer each time a user has to leave the publically shared computer, and (ii) remembering to take safety measures, such as, for example, manually closing each browser tab, saving documents, and/or erasing one's web history prior to ending the user session, the disclosed embodiments herein automatically encrypt and securely store a user's user session data for subsequent access by the user when the user moves away from the publically shared computer. This automatic process improves upon at least some known data security measures associated with publically shared computers, and further reduces the number of access attempts associated with a single user. For example, if a user steps away from a publically shared computer multiple times in a short span of time to take a phone call, use the restroom, and/or retrieve an item from their vehicle, the user may end a user session each time they leave and request a new user session each time they return to the publically shared computer, thereby consuming network bandwidth and resources. Thus, by generating a session key associated with the facial and appearance features of a user, and by automatically encrypting the user's user session for subsequent retrieval, the embodiments described herein reduce the consumption of network bandwidth and resources. Additionally, protecting a user's sensitive personal data in the manner described herein prevents bad actors from performing unauthorized transactions and activities with compromised personal data, thereby further saving computational and human resources to resolve such issues in the future.

Further aspects of the disclosure are discussed in the additional embodiments below. It should be understood that embodiments in this disclosure are exemplary only, and that other embodiments may include various combinations of features from other embodiments, as well as additional or fewer features.

In general, any process discussed in this disclosure that is understood to be computer-implementable, such as the process illustrated in FIGS. 2 and 3, may be performed by one or more processors of a computer system, such as computer system 135, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as computer system 135, may include one or more computing devices. If the one or more processors of the computer system 135 are implemented as a plurality of processors, the plurality of processors may be included in a single computing device or distributed among a plurality of computing devices. If a computer system 135 comprises a plurality of computing devices, the memory of the computer system 135 may include the respective memory of each computing device of the plurality of computing devices.

Figure 4:
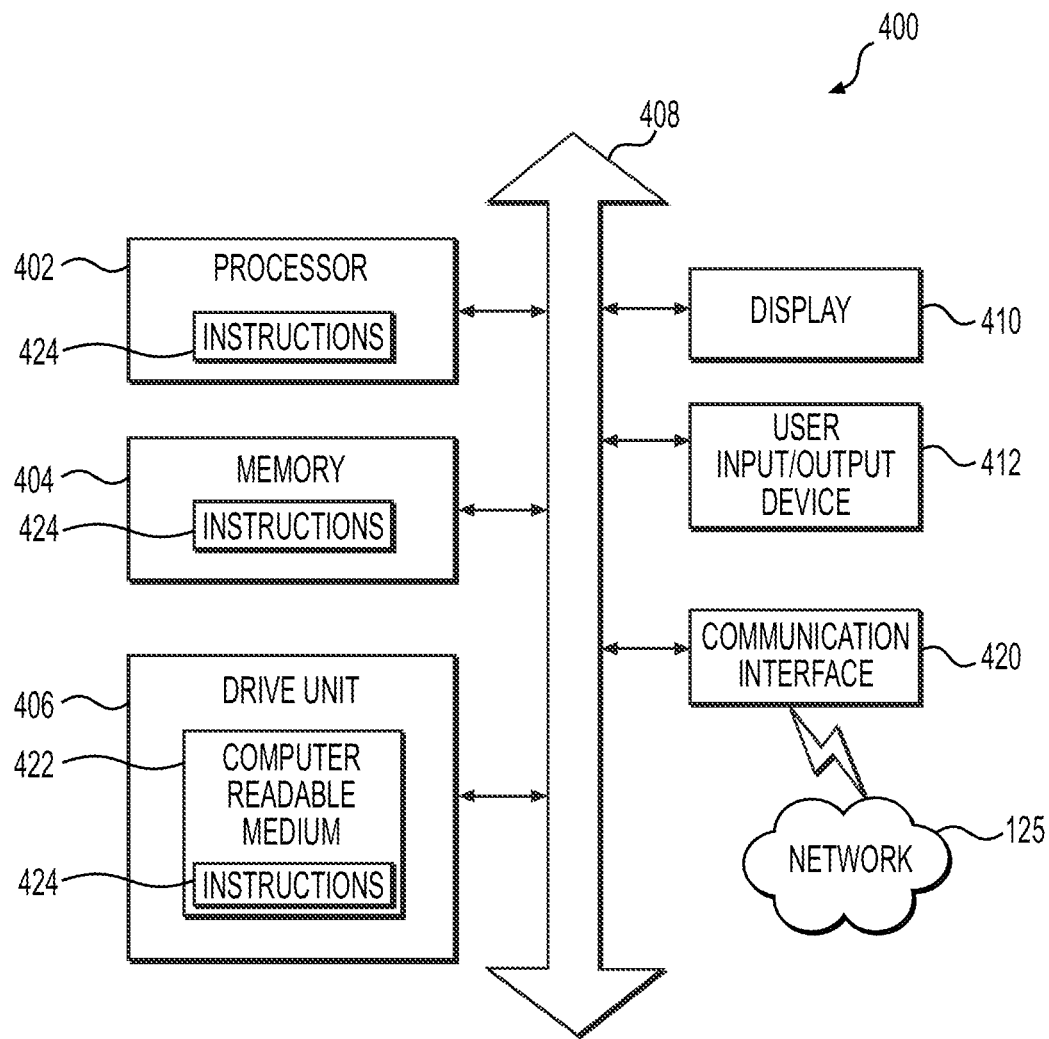
FIG. 4 depicts an example of a computing device, according to one or more embodiments.

FIG. 4 is a simplified functional block diagram of a computer system 400 that may be configured as a device for executing the methods of FIGS. 2 and 3, according to exemplary embodiments of the present disclosure. FIG. 4 is a simplified functional block diagram of a computer that may be configured as the computer system 135 according to exemplary embodiments of the present disclosure. In various embodiments, any of the systems herein may be an assembly of hardware including, for example, a data communication interface 420 for packet data communication. The platform also may include a central processing unit ("CPU") 402, in the form of one or more processors, for executing program instructions. The platform may include an internal communication bus 408, and a storage unit 406 (such as ROM, HDD, SDD, etc.) that may store data on a computer readable medium 422, although the system 400 may receive programming and data via network communications. The system 400 may also have a memory 404 (such as RAM) storing instructions 424 for executing techniques presented herein, although the instructions 424 may be stored temporarily or permanently within other modules of system 400 (e.g., processor 402 and/or computer readable medium 422). The system 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to preserving a user session in a public environment, it should be appreciated that the presently disclosed embodiments may be applicable to transmitting data and may be applicable to any environment, such as a desktop or laptop computer, a banking environment, a kiosk environment, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2 and 3, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method of automatically preserving a user session on a public access user computing device, the method comprising:
    receiving, from at least one camera, image data associated with a first user at the public access user computing device;
    analyzing the received image data to extract facial and appearance features associated with the first user;
    generating, based on the analyzed image data, a session key associated with the user session, wherein the user session is associated with the first user;
    detecting, based on the received image data, by employing a machine learning model trained using a dataset of actions collected from a plurality of previous users, that the first user has moved away from the public access user computing device;
    automatically encrypting, based upon the detection, the user session associated with the first user by:
        comparing the user session associated with the first user with a new generic user session to create a plurality of index-difference vectors associated with the user session;
        linking the plurality of index-difference vectors with the generated session key based on the user session; and
        storing, in a memory, the plurality of index-difference vectors, wherein the encrypted user session is configured to be subsequently activated by the first user; and
    initiating the new generic user session on the public access user computing device for a second user.

2. The computer-implemented method of claim 1, wherein analyzing the received image data includes converting the extracted facial and appearance features to generate the session key, and wherein the generated session key is a hash.

3. The computer-implemented method of claim 1, wherein the facial and appearance features of the first user are extracted by employing at least one of a convolution neural network (CNN) model or a long short-term memory (LSTM) recurrent neural network model on the received image data.

4. The computer-implemented method of claim 1, wherein the extracted facial and appearance features include a size and a distance between one or more of eyes, a nose, or a mouth of the first user.

5. The computer-implemented method of claim 1, wherein the plurality of index-difference vectors is associated with a plurality of applications open during the user session associated with the first user.

6. The computer-implemented method of claim 1, wherein one of the plurality of index-difference vectors is associated with a web browser and a plurality of website tabs open in the web browser during the user session.

7. The computer-implemented method of claim 1, wherein detecting that the first user has moved away from the public access user computing device further comprises detecting a sequence of action steps of the first user that indicates movement away from the public access user computing device.

8. The computer-implemented method of claim 7, further comprising predicting, based on the received image data, a plurality of types of movement of the first user during a period of time.

9. The computer-implemented method of claim 1, further comprising:
   detecting, based on subsequent image data received from the camera, that the first user has returned to the public access user computing device; and
   retrieving, based on the detection, the session key associated with the first user.

10. The computer-implemented method of claim 9, further comprising:
    decrypting the user session associated with the first user; and
    activating the user session associated with the first user on the public access user computing device.

11. The computer-implemented method of claim 9, wherein detecting that the first user has returned to the public access user computing device further comprises:
    extracting facial and appearance features from the subsequent image data; and
    comparing the extracted facial and appearance features to those associated with the session key of the first user.

12. The computer-implemented method of claim 1, wherein the encrypted user session is configured to be subsequently activated by the first user at a different public access user computing device.

13. A system for automatically preserving a user session on a public access user computing device, the system comprising:
    a memory storing instructions and a machine learning model trained using a dataset of actions collected from a plurality of previous users; and
    a processor operatively connected to the memory and configured to execute the instructions to perform acts including:
       receiving, from at least one camera, image data associated with a first user at the public access user computing device;
       analyzing the received image data to extract facial and appearance features associated with the first user;
       generating, based on the analyzed image data, a session key associated with the user session, wherein the user session is associated with the first user;
       detecting, based on the received image data, by employing the machine learning model, that the first user has moved away from the public access user computing device;
       automatically encrypting, based upon the detection, the user session associated with the first user by:
          comparing the user session associated with the first user with a new generic user session to create a plurality of index-difference vectors associated with the user session;
          linking the plurality of index-difference vectors with the generated session key based on the user session; and
          storing, in a memory, the plurality of index-difference vectors, wherein the encrypted user session is configured to be subsequently activated by the first user; and
       initiating the new generic user session on the public access user computing device for a subsequent user.

14. The system of claim 13, wherein detecting that the first user has moved away from the public access user computing device further includes detecting a sequence of action steps of the first user that indicates movement away from the public access user computing device.

15. The system of claim 13, wherein the acts further include:
    detecting, based on subsequent image data received from the camera, that the first user has returned to the public access user computing device; and
    retrieving, based on the detection, the session key associated with the first user.

16. A computer-implemented method of automatically preserving a user session on a public access user computing device, the method comprising:
    receiving, from at least one camera, a first set of image data associated with a first user at the public access user computing device;
    analyzing the received first set of image data to extract facial and appearance features associated with the first user;
    generating, based on the analyzed first set of image data, a session key associated with the user session, wherein the user session is associated with the first user:
    detecting, based on the received first set of image data, by employing a machine learning model trained using a dataset of actions collected from a plurality of previous users, that the first user has moved away from the public access user computing device;
    automatically encrypting, based upon the detection, the user session associated with the first user to prevent a subsequent user from accessing the user session by:
       comparing the user session associated with the first user with a new generic user session to create a plurality of index-difference vectors associated with the user session;
       linking the plurality of index-difference vectors with the generated session key based on the user session; and
    storing, in a memory, the plurality of index-difference vectors;
    causing display, on the public access user computing device, of (a) a first option to activate the user session associated with the first user, and (b) a second option to initiate the new generic user session separate from the user session associated with the first user; and
    in response to receiving a selection of the first option, receiving a second set of image data associated with the first user from the camera to determine whether to activate the user session associated with the first user.

\* \* \* \* \*